(12) United States Patent
Hiramatsu et al.

(10) Patent No.: US 11,834,974 B2
(45) Date of Patent: Dec. 5, 2023

(54) OIL SEPARATOR FOR INTERNAL COMBUSTION ENGINE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Chiaki Hiramatsu, Kariya (JP); Masami Ishikawa, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/701,262

(22) Filed: Mar. 22, 2022

(65) Prior Publication Data

US 2022/0307398 A1    Sep. 29, 2022

(30) Foreign Application Priority Data

Mar. 26, 2021 (JP) ................................ 2021-053913

(51) Int. Cl.
  *F01M 13/04* (2006.01)
  *B01D 45/06* (2006.01)
  *B01D 45/08* (2006.01)

(52) U.S. Cl.
  CPC ............ *F01M 13/04* (2013.01); *B01D 45/06* (2013.01); *B01D 45/08* (2013.01); *F01M 2013/0461* (2013.01)

(58) Field of Classification Search
  CPC ........... F01M 13/04; F01M 2013/0461; B01D 45/06; B01D 45/08
  See application file for complete search history.

(56) References Cited

U.S. PATENT DOCUMENTS 10,731,529 B2 *   8/2020   Sazawa ................. F01M 13/04
2006/0254566 A1 * 11/2006   Yasuhara ............... F01M 13/04
                                                            123/41.86

(Continued)

FOREIGN PATENT DOCUMENTS

CN     110131013 A   8/2019
JP     2019-078236 A   5/2019

OTHER PUBLICATIONS

Chinese Office Action in counterpart Chinese Application No. 202210270553.3, dated Mar. 29, 2023 (with English translation).

*Primary Examiner* — Kurt Philip Liethen
(74) *Attorney, Agent, or Firm* — Greenblum & Bernstein, P.L.C.

(57) ABSTRACT

An oil separator for an internal combustion engine includes a case and a separation wall. The case includes inflow ports into which blow-by gas flows, a gas outflow port, and an oil discharge port. An inside of the case is divided by the separation wall into an upstream passage and a downstream passage. The downstream passage is located on the upper side of the upstream passage. The inflow ports and the oil discharge port are connected to the upstream passage. The gas outflow port is connected to the downstream passage. The inflow ports and the oil discharge port are arranged in a direction intersecting the vertical direction. The separation wall includes one connection passage that connects the upstream passage to the downstream passage on the upper side of the oil discharge port. The separation wall is located on the upper side of the inflow ports.

7 Claims, 4 Drawing Sheets

(56) References Cited

U.S. PATENT DOCUMENTS

| | | | |
|---|---|---|---|
| 2015/0337697 A1* | 11/2015 | Kira | F01M 13/04 |
| | | | 123/41.86 |
| 2018/0161712 A1* | 6/2018 | Murata | F01M 13/0405 |
| 2019/0178122 A1* | 6/2019 | Suzuki | F01M 13/0405 |
| 2019/0226370 A1* | 7/2019 | Miyanaga | F01M 13/04 |
| 2019/0249579 A1* | 8/2019 | Sazawa | F01M 13/04 |

* cited by examiner

OIL SEPARATOR FOR INTERNAL COMBUSTION ENGINE

BACKGROUND

1. Field

The present disclosure relates to an oil separator for an internal combustion engine.

2. Description of Related Art

Conventional oil separators are disposed on the side surface of the cylinder block of an internal combustion engine (refer to, for example, Japanese Laid-Open Patent Publication No. 2019-78236). The oil separator disclosed in the literature includes a case and a separator plate. The case includes a separation chamber for separating oil from blow-by gas. The separator plate partitions the separation chamber. The lower part of the case includes a first port and a second port into which gas is drawn and from which oil is discharged. The first port and the second port are spaced apart from each other in the width direction of the case that is orthogonal to the height direction of the first port and the second port. The upper part of the case includes a gas discharge port.

The separator plate partitions the separation chamber into an upstream space and a downstream space. The upstream space defines the lower part of the separation chamber. The downstream space defines the upper part of the separation chamber. The separator plate is located above the space between the first port and the second port in the width direction.

The separator plate includes a first opening and a second opening that connect the upstream space to the downstream space. The first opening is located above the first port. The second opening is located above the second port.

The blow-by gas that has flowed from the first port or the second port into the case flows through the first opening and the second opening toward the gas discharge port. When the blow-by gas collides with the separator plate, oil is separated from the blow-by gas. This causes the oil to be discharged from the first port or the second port to the outside of the case.

In such an oil separator, when the flow rate of blow-by gas increases, the amount of oil contained in the blow-by gas also increases. Thus, it is desired that the oil separation performance of the oil separator be improved.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An oil separator for an internal combustion engine that solves the above-described problem includes a case including inflow ports into which blow-by gas flows, a gas outflow port from which the blow-by gas flows, and an oil discharge port. The oil separator also includes a separation wall located in the case. The oil separator is configured to separate oil from the blow-by gas on the separation wall and discharge the separated oil through the oil discharge port to an outside of the case. An upper side in a vertical direction is simply referred to as an upper side. An inside of the case is divided by the separation wall into an upstream passage and a downstream passage. The upstream passage is located on an upstream side in a flow direction of the blow-by gas. The downstream passage is located on a downstream side of the upstream passage in the flow direction and located on the upper side of the upstream passage. The inflow ports and the oil discharge port are connected to the upstream passage. The gas outflow port is connected to the downstream passage. The inflow ports and the oil discharge port are arranged in a direction intersecting the vertical direction. The separation wall includes one connection passage that connects the upstream passage to the downstream passage on the upper side of the oil discharge port. The separation wall is located on the upper side of the inflow ports.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An oil separator for an internal combustion engine according to an embodiment will now be described with reference to FIGS. 1 to 6.

The oil separator of the present embodiment is coupled to the side surface of a cylinder block of the body of the internal combustion engine. The oil separator is used to separate oil from blow-by gas.

Case 10

Figure 1:
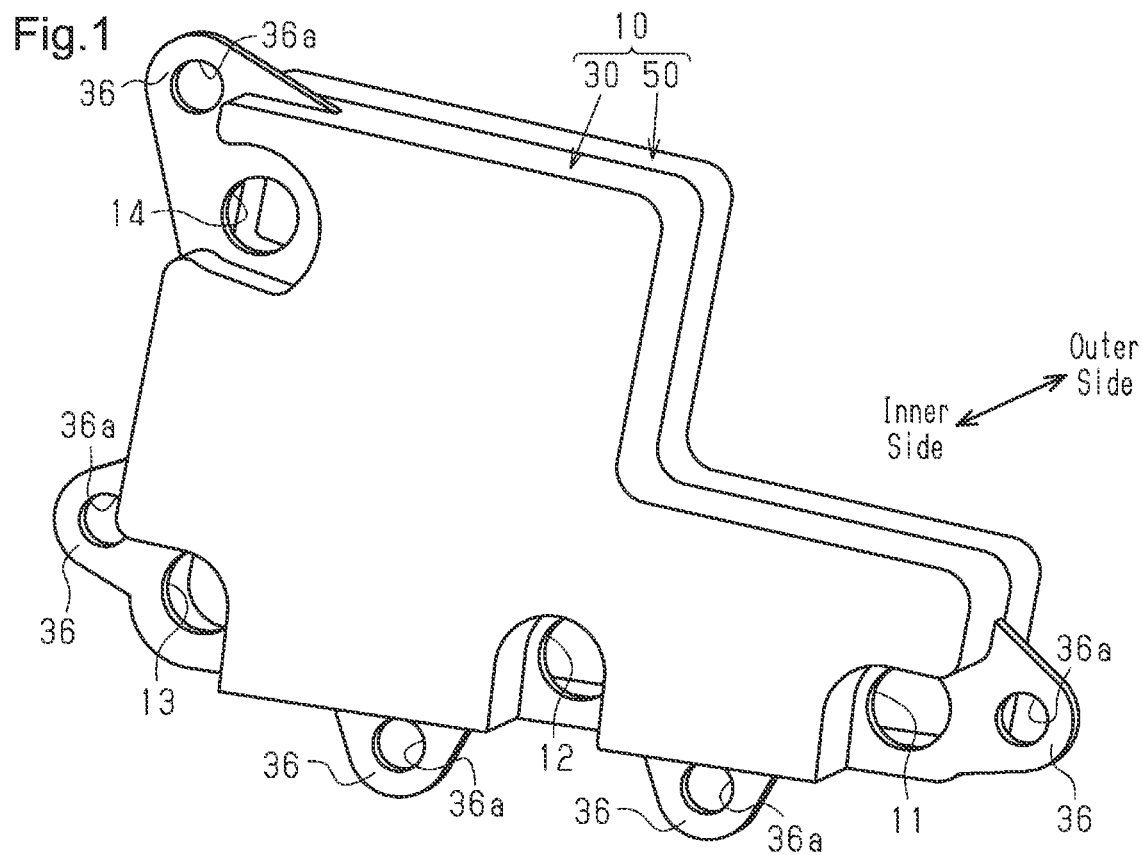
FIG. 1 is a perspective view showing an oil separator according to an embodiment.

As shown in FIG. 1, the oil separator includes a case 10. The case 10 is coupled to the side surface of the cylinder block (not shown).

The direction in which blow-by gas flows is hereinafter simply referred to as the flow direction. The direction in which the case 10 opposes the side surface of the cylinder block is referred to as the opposing direction. The direction orthogonal to the vertical direction and the opposing direction is referred to as the width direction. The upper side and the lower side in the vertical direction are simply referred to as the upper side and the lower side, respectively. The side toward the cylinder block in the opposing direction is referred to as the inner side. The side away from the cylinder block in the opposing direction is referred to as the outer side.

The case 10 includes an inner case 30 and an outer case 50. The inner case 30 is coupled to the side surface of the cylinder block. The outer case 50 is located on the opposite side of the inner case 30 from the cylinder block. The inner case 30 and the outer case 50 are joined to each other. The inner case 30 and the outer case 50 are made of, for example, plastic. The inner case 30 and the outer case 50 correspond to a first member and a second member, respectively.

The internal structure of the case 10 will now be described with reference to FIGS. 2 and 3. For illustrative purposes, FIGS. 2 and 3 show the internal structure of the inner case 30.

Figure 2:
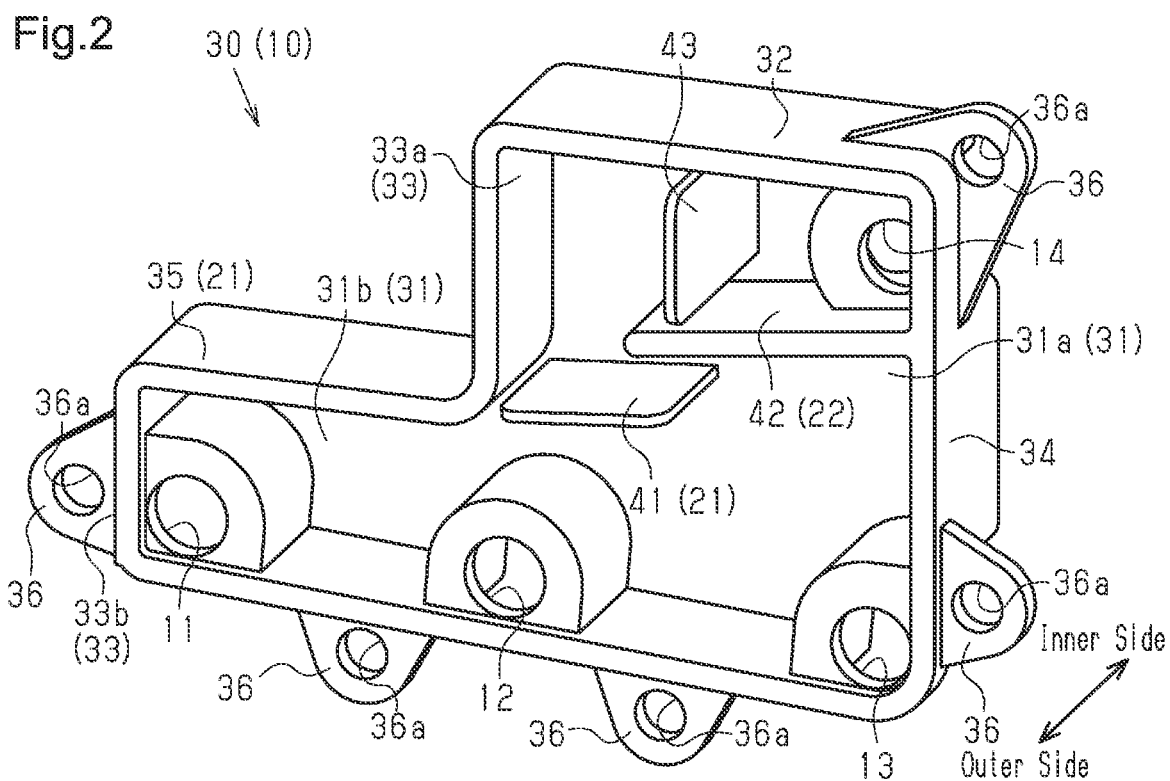
FIG. 2 is a perspective view showing the inner case.
Figure 3:
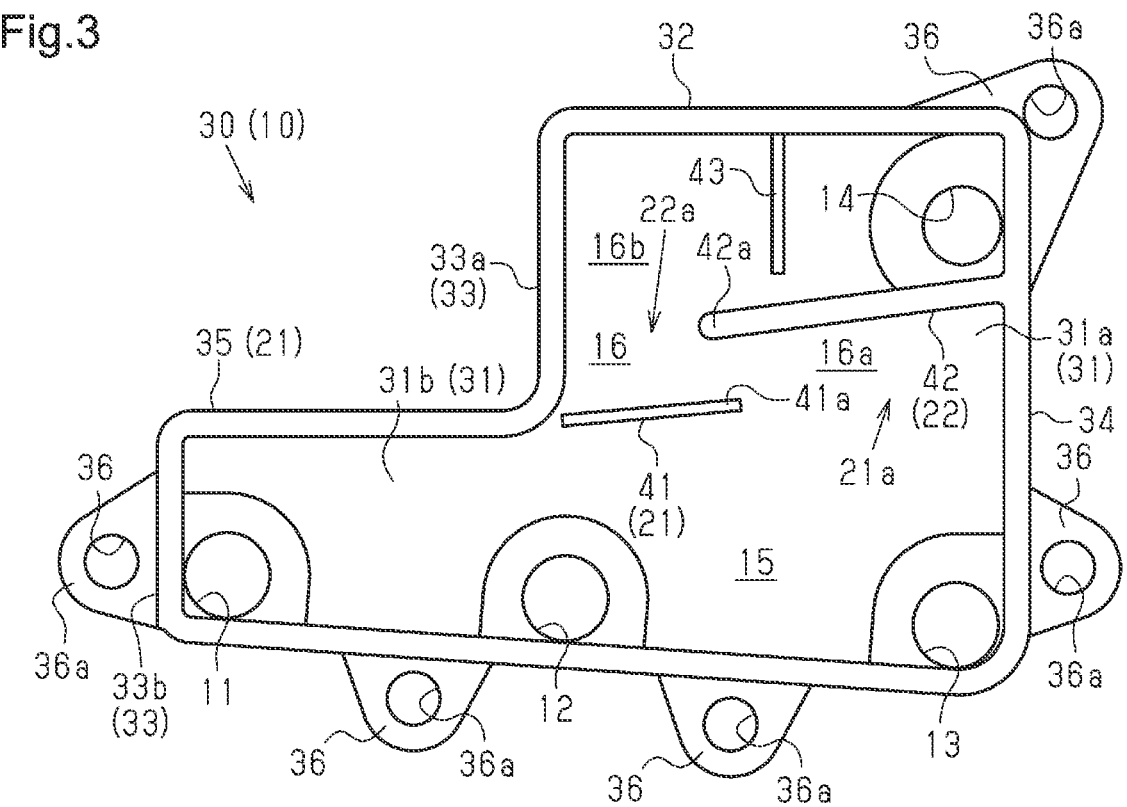
FIG. 3 is a front view showing the inner case.

As shown in FIGS. 2 and 3, the case 10 includes a first inflow port 11 and a second inflow port 12 into which blow-by gas flows, an oil discharge port 13 from which oil is discharged, and a gas outflow port 14 from which blow-by gas flows. The first inflow port 11, the second inflow port 12, and the oil discharge port 13 are located at the lower part of the case 10. The gas outflow port 14 is located at the upper part of the case 10.

As shown in FIG. 3, the first inflow port 11, the second inflow port 12, and the oil discharge port 13 are arranged in this order in a direction intersecting the vertical direction. In other words, the oil discharge port 13 is located on one side of the first inflow port 11 and the second inflow port 12 in an arrangement direction of the first inflow port 11 and the second inflow port 12.

The case 10 includes a first separation wall 21 and a second separation wall 22 that separate oil from blow-by gas. The first separation wall 21 is located on the upper side of the inflow ports 11, 12. The second separation wall 22 is located on the upper side of the oil discharge port 13. The second separation wall 22 is located on the upper side of the first separation wall 21.

The inside of the case 10 is divided by the first separation wall 21 into an upstream passage 15 and a downstream passage 16. The upstream passage 15 is located on the upstream side in the flow direction in the case 10. The downstream passage 16 is located on the downstream side of the upstream passage 15 in the flow direction and is located on the upper side of the upstream passage 15. The inflow ports 11, 12 and the oil discharge port 13 are connected to the upstream passage 15.

The first separation wall 21 includes one first connection passage 21*a* that connects the upstream passage 15 to the downstream passage 16. The first connection passage 21*a* is located on the upper side of the oil discharge port 13. The second separation wall 22 is located on the upper side of the first connection passage 21*a*.

The downstream passage 16 is divided by the second separation wall 22 into a first downstream passage 16*a* and a second downstream passage 16*b*. The first downstream passage 16*a* is located on the upstream side in the flow direction in the downstream passage 16. The second downstream passage 16*b* is located on the downstream side of the first downstream passage 16*a* in the flow direction and is located on the upper side of the first downstream passage 16*a*. The gas outflow port 14 is connected to the second downstream passage 16*b*.

The second separation wall 22 includes one second connection passage 22*a* that connects the first downstream passage 16*a* to the second downstream passage 16*b*. The second connection passage 22*a* is located on the upper side of the first separation wall 21. The first connection passage 21*a* and the second connection passage 22*a* are located such that they do not overlap each other in the vertical direction. Accordingly, the first connection passage 21*a* and the second connection passage 22*a* are located on the opposite sides of the downstream passage 16 in the width direction.

Inner Case 30

As shown in FIGS. 2 and 3, the inner case 30 includes an inner side opposing wall 31 and a peripheral wall 32. The inner side opposing wall 31 opposes the side surface of the cylinder block. The peripheral wall 32 protrudes from the perimeter of the inner side opposing wall 31 toward the outer side over the entire periphery. The surface of the peripheral wall 32 opposing the outer case 50 is provided with a joint (not shown) over the entire periphery. The joint is joined to the outer case 50.

The inner side opposing wall 31 includes a first portion 31*a* and a second portion 31*b*. The first portion 31*a* has a substantially rectangular shape elongated in the vertical direction. The second portion 31*b* extends from the lower part of the first portion 31*a* toward one side in the width direction. The entire inner side opposing wall 31 is substantially L-shaped.

The peripheral wall 32 includes a first side wall 33 and a second side wall 34 that oppose each other in the width direction. The first side wall 33 and the second side wall 34 define the upstream passage 15 and the downstream passage 16.

The first side wall 33 includes an upper first side wall 33*a* and a lower first side wall 33*b*. The upper first side wall 33*a* protrudes toward the outer side from a first end of the first portion 31*a* in the width direction. The lower first side wall 33*b* protrudes toward the outer side from a first end of the second portion 31*b* in the width direction.

The second side wall 34 protrudes toward the outer side from a second end of the first portion 31*a* in the width direction, which is opposite from the first end. The second side wall 34 opposes the upper first side wall 33*a* and the lower first side wall 33*b*.

The peripheral wall 32 includes a coupling wall 35 that couples the upper first side wall 33*a* to the lower first side wall 33*b*. The coupling wall 35 extends in the width direction and opposes a portion of the peripheral wall 32 that defines the bottom surface of the inner case 30.

As shown in FIG. 3, the first inflow port 11, the second inflow port 12, and the oil discharge port 13 are spaced apart from each other at the lower part of the inner side opposing wall 31. The first inflow port 11, the second inflow port 12, and the oil discharge port 13 are located in this order from the first side wall 33 toward the second side wall 34. The second inflow port 12 is located on the lower side of the first inflow port 11. The oil discharge port 13 is located on the lower side of the second inflow port 12.

The upper part of the inner side opposing wall 31 includes the gas outflow port 14. The gas outflow port 14 is located on the upper side of the oil discharge port 13. The gas outflow port 14 is located on the opposite side of a second partition plate 42 (described later) from the oil discharge port 13 in the vertical direction.

First Partition Plate 41

A first partition plate 41 is disposed between the first side wall 33 and the second side wall 34 on the upper side of the second inflow port 12. The first partition plate 41 protrudes from the first portion 31a of the inner side opposing wall 31 toward the outer side. The first partition plate 41 extends so as to become higher from the first side wall 33 toward the second side wall 34. The first partition plate 41 corresponds to a partition plate of the first member.

The inside of the inner case 30 is divided by the first partition plate 41 into the upstream passage 15 and the first downstream passage 16a. In the inner case 30, the coupling wall 35 and the first partition plate 41 define a part of the first separation wall 21.

The first partition plate 41 includes an end 41a that opposes the second side wall 34. A gap is provided between the end 41a and the second side wall 34. The gap defines the first connection passage 21a. A small gap is provided between the peripheral wall 32 and the end of the first partition plate 41 that is opposite from the end 41a.

The end 41a is located between the second inflow port 12 and the oil discharge port 13 in the width direction. That is, an opening edge of the first connection passage 21a formed by the end 41a is located on the upper side of a portion between the second inflow port 12 and the oil discharge port 13.

Second Partition Plate 42

The second partition plate 42 is located on the upper side of the first partition plate 41 and the oil discharge port 13. The second partition plate 42 protrudes from the second side wall 34 toward the first side wall 33. The second partition plate 42 extends so as to become lower from the second side wall 34 toward the first side wall 33. The entire second partition plate 42 is coupled to the inner side opposing wall 31.

The inside of the inner case 30 is divided by the second partition plate 42 into the first downstream passage 16a and the second downstream passage 16b. In the inner case 30, the second partition plate 42 defines a part of the second separation wall 22.

The second partition plate 42 includes an end 42a that opposes the upper first side wall 33a. A gap is provided between the end 42a and the upper first side wall 33a. The gap defines a part of the second connection passage 22a.

The end 42a is located between the second inflow port 12 and the oil discharge port 13 in the width direction. That is, an opening edge of the second connection passage 22a formed by the end 42a is located on the upper side of the portion between the second inflow port 12 and the oil discharge port 13.

The surface of the second partition plate 42 opposing the outer case 50 is provided with a joint (not shown) to which the outer case 50 is joined. Accordingly, the inner case 30 is joined to the outer case 50 on the peripheral wall 32 and the second partition plate 42.

First Shielding Plate 43

The second downstream passage 16b includes a first shielding plate 43 that protrudes from the first portion 31a of the inner side opposing wall 31 toward the outer side. The first shielding plate 43 extends in the vertical direction. The first shielding plate 43 is coupled to a portion of the peripheral wall 32 opposing the second partition plate 42. The first shielding plate 43 protrudes from the inner side opposing wall 31 by a larger amount than the peripheral wall 32 protrudes from the inner side opposing wall 31. Thus, the protruding end of the first shielding plate 43 is located in the outer case 50. A gap is provided between the protruding end of the first shielding plate 43 in the opposing direction and the inner surface of the outer case 50.

Fixed Portion 36

The perimeter of the inner case 30 includes fixed portions 36. The fixed portions 36 are protruded outward from the inner case 30 and fixed to the cylinder block. Each fixed portion 36 includes an insertion hole 36a. A bolt (not shown) used to fix the inner case 30 to the cylinder block is inserted into the insertion hole 36a.

Outer Case 50

Figure 4:
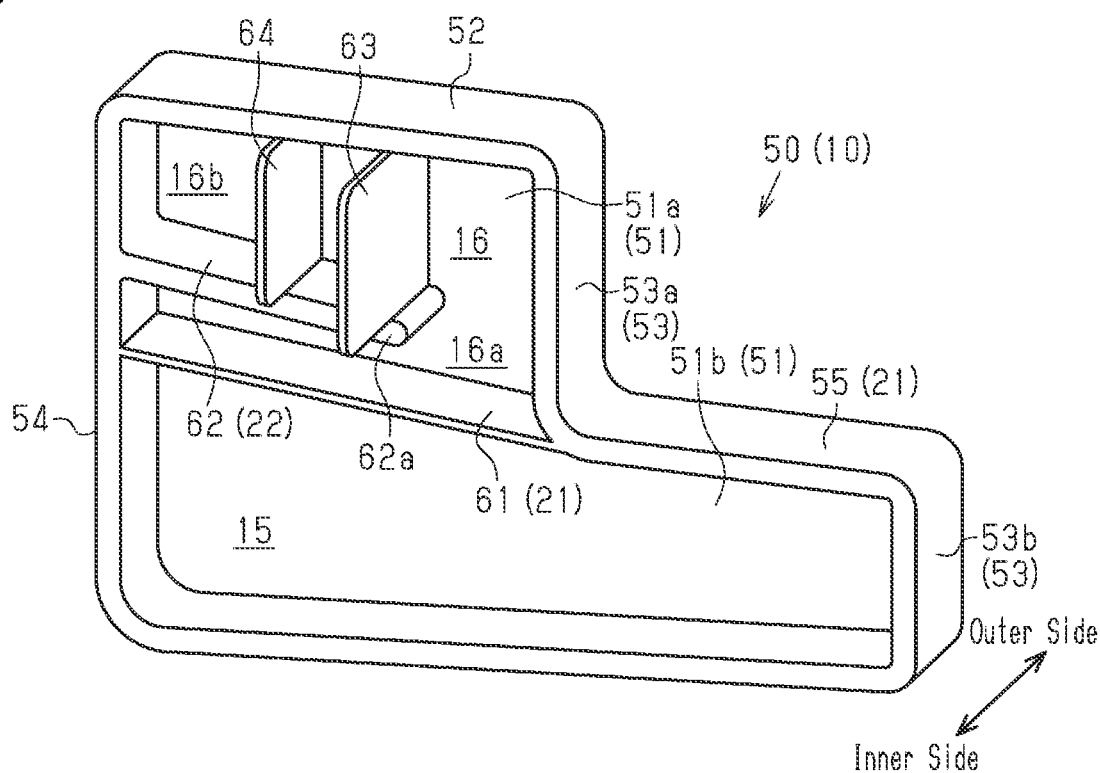
FIG. 4 is a perspective view showing the outer case.

As shown in FIG. 4, the outer case 50 includes an outer side opposing wall 51 and a peripheral wall 52. The outer side opposing wall 51 opposes the inner side opposing wall 31 of the inner case 30. The peripheral wall 52 protrudes from the perimeter of the outer side opposing wall 51 toward the inner side over the entire periphery.

The outer side opposing wall 51 includes a first portion 51a and a second portion 51b. The first portion 51a has a substantially rectangular shape. The second portion 51b extends from the lower part of the first portion 51a toward one side in the width direction. The entire outer side opposing wall 51 is substantially L-shaped.

The peripheral wall 52 includes a first side wall 53 and a second side wall 54 that oppose each other in the width direction. The first side wall 53 and the second side wall 54 define the upstream passage 15 and the downstream passage 16.

Some of the components of the outer case 50 are shaped in correspondence with the components of the inner case 30. Thus, the components of the outer case 50 that correspond to the components of the inner case 30 are hereinafter given reference numbers 5* and 6* obtained by adding 20 to reference numbers 3* and 4*, which represent the components of the inner case 30, and redundant description may be omitted.

First Partition Plate 61

A first partition plate 61 is disposed between the first side wall 53 and the second side wall 54 to divide the inside of the outer case 50 into the upstream passage 15 and the first downstream passage 16a. The first partition plate 61 opposes the first partition plate 41 of the inner case 30 in the opposing direction. The first partition plate 61 couples the first side wall 53 to the second side wall 54. The first partition plate 61 corresponds to a partition plate of the second member.

Figure 5:
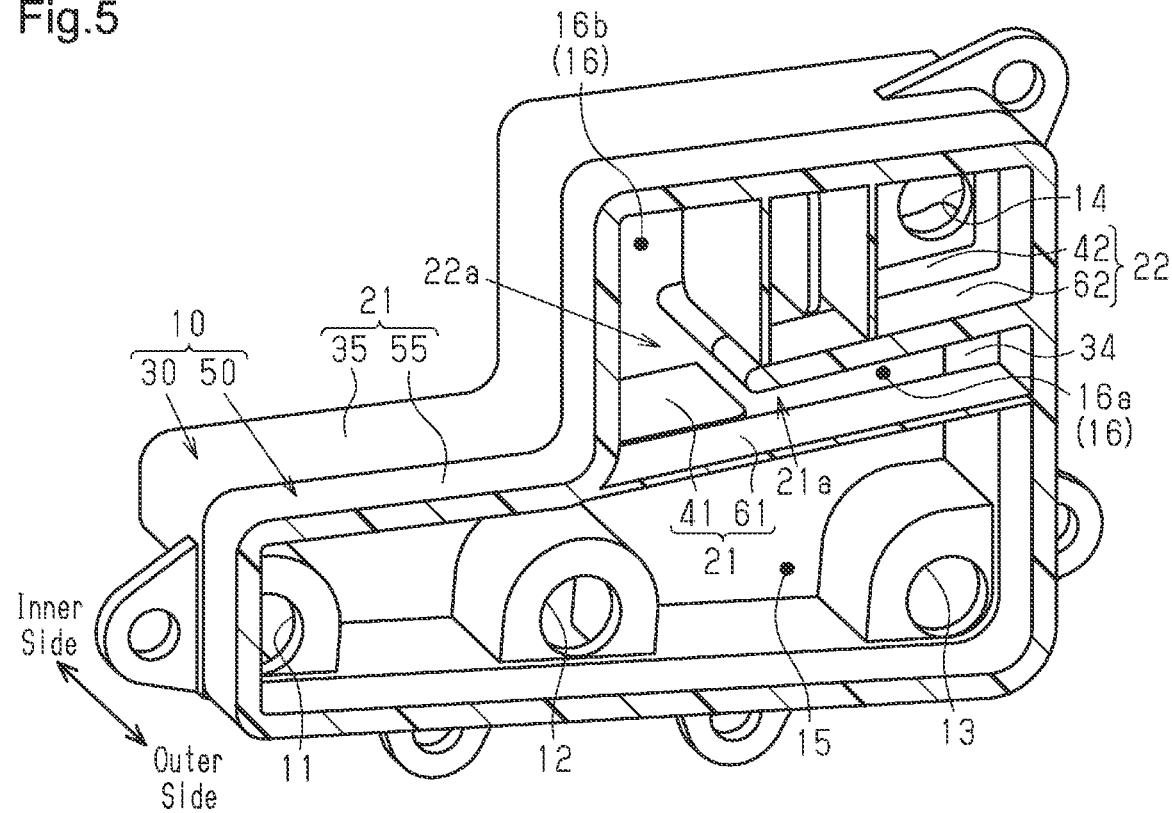
FIG. 5 is a cross-sectional perspective view showing the inside of the case.

In the outer case 50, a coupling wall 55 and the first partition plate 61 define a part of the first separation wall 21. Accordingly, in the present embodiment, the first separation wall 21 is defined by the coupling wall 35 and the first partition plate 41 of the inner case 30 and by the coupling wall 55 and the first partition plate 61 of the outer case 50. Further, as shown in FIG. 5, the first connection passage 21a is defined by the gap between the first partition plate 41 and the second side wall 34 of the inner case 30 and by the first partition plate 61 of the outer case 50.

Second Partition Plate 62

As shown in FIG. 4, a second partition plate 62 is disposed on the upper side of the first partition plate 61 to divide the inside of the outer case 50 into the first downstream passage 16a and the second downstream passage 16b. The entire second partition plate 62 is joined to the second partition plate 42 of the inner case 30 in the opposing direction.

In the outer case 50, the second partition plate 62 defines a part of the second separation wall 22. Accordingly, in the present embodiment, the second separation wall 22 is defined by the second partition plate 42 of the inner case 30 and the second partition plate 62 of the outer case 50.

The second partition plate 62 includes an end 62a that opposes an upper first side wall 53a. A gap is provided between the end 62a and the upper first side wall 53a. The gap defines a part of the second connection passage 22a. Accordingly, the second connection passage 22a is defined by the gap between the end 42a and the upper first side wall 33a of the inner case 30 and by the gap between the end 62a and the upper first side wall 53a of the outer case 50.

Second Shielding Plate 63, Third Shielding Plate 64

The second downstream passage 16b includes a second shielding plate 63 and a third shielding plate 64 that protrude from the first portion 51a of the outer side opposing wall 51 toward the inner side. The second shielding plate 63 and the third shielding plate 64 are spaced apart from each other in the width direction. The third shielding plate 64 is located downstream side of the second shielding plate 63 in the flow direction.

The second shielding plate 63 and the third shielding plate 64 extend in the vertical direction. The second shielding plate 63 and the third shielding plate 64 are coupled to portions of the peripheral wall 52 that oppose the second partition plate 62.

Figure 6:
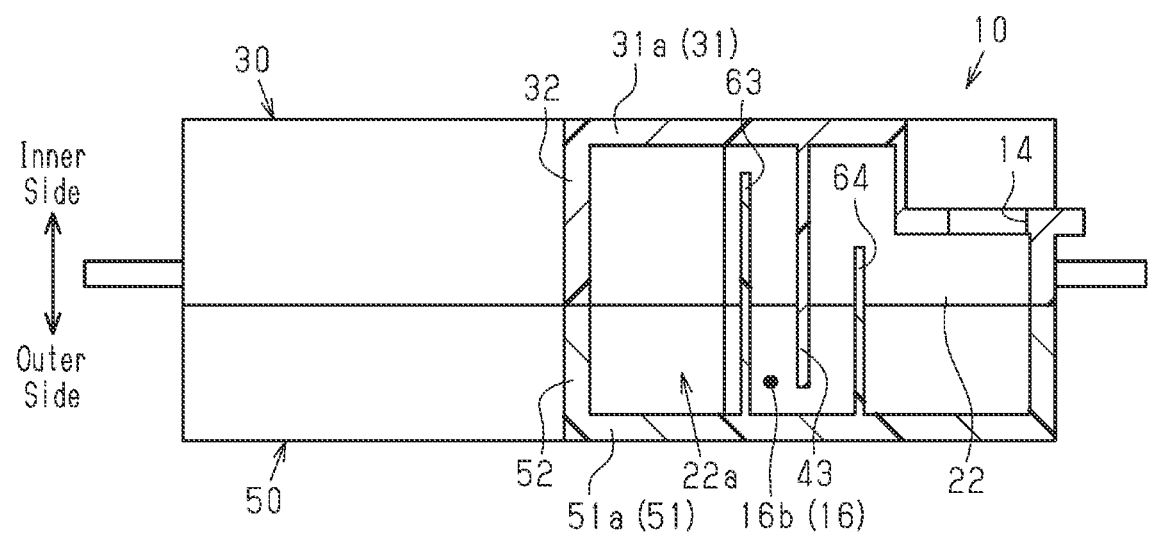
FIG. 6 is a cross-sectional perspective view showing the downstream passage in the case.

As shown in FIG. 6, the second shielding plate 63 and the third shielding plate 64 protrude from the outer side opposing wall 51 by a larger amount than the peripheral wall 52 protrudes from the outer side opposing wall 51. The second shielding plate 63 protrudes by a larger amount than the third shielding plate 64. Thus, the protruding ends of the second shielding plate 63 and the third shielding plate 64 are located in the inner case 30. A gap is provided between the protruding end of each of the second shielding plate 63 and the third shielding plate 64 in the opposing direction and the inner surface of the inner case 30.

The first shielding plate 43 of the inner case 30 is located between the second shielding plate 63 and the third shielding plate 64. Accordingly, the shielding plates 63, 43, 64 form a passage through which blow-by gas flows in a serpentine manner in the second downstream passage 16b.

The operation of the present embodiment will now be described.

Referring to FIG. 5, the blow-by gas that has flowed into the case 10 from the inflow ports 11, 12 collides with the lower surface of the first separation wall 21, which is located on the upper side of the inflow ports 11, 12. This causes the oil contained in the blow-by gas to be separated from the blow-by gas. The oil separated from the blow-by gas drops due to its weight and is thus accumulated in the lower part of the case 10. Then, the oil is discharged out of the case 10 through the oil discharge port 13. In contrast, the blow-by gas flows through the first connection passage 21a from the upstream passage 15 toward the first downstream passage 16a.

One first connection passage 21a is provided on the upper side of the oil discharge port 13. This allows the blow-by gas that has flowed into the case 10 from the inflow ports 11, 12 to easily collide with the first separation wall 21 before reaching the first connection passage 21a. That is, the blow-by gas easily flows through the first connection passage 21a toward the first downstream passage 16a after colliding with the first connection passage 21a (operation 1).

The blow-by gas that has flowed through the first connection passage 21a into the first downstream passage 16a collides with the lower surface of the second separation wall 22, which is located on the upper side of the first connection passage 21a. Thus, the oil that has not been separated from the blow-by gas by the first separation wall 21 is separated from the blow-by gas (operation 2).

Then, the blow-by gas flows from the first downstream passage 16a toward the second downstream passage 16b through the second connection passage 22a.

Referring to FIG. 6, the blow-by gas that has flowed into the second downstream passage 16b through the second connection passage 22a flows between the shielding plates 63, 43, 64 in a serpentine manner and then flows from the gas outflow port 14 to the outside of the case 10.

The advantages of the embodiment will now be described.

(1) The oil separator includes the case 10 and the first separation wall 21. The case 10 includes the first inflow port 11 and the second inflow port 12, into which blow-by gas flows, the gas outflow port 14, from which blow-by gas flows, and the oil discharge port 13, from which the oil separated from the blow-by gas is discharged. The inside of the case 10 is divided by the first separation wall 21 into the upstream passage 15 and the downstream passage 16. The first inflow port 11, the second inflow port 12, and the oil discharge port 13 are connected to the upstream passage 15. The gas outflow port 14 is connected to the downstream passage 16. The first separation wall 21 includes one first connection passage 21a, which connects the upstream passage 15 to the downstream passage 16 on the upper side of the oil discharge port 13. The first separation wall 21 is located on the upper side of the inflow ports 11, 12.

In such a structure, the case 10 includes the first inflow port 11 and the second inflow port 12. Thus, as compared with an oil separator including a single inflow port, the flow rate of blow-by gas flowing into the case 10 is easily increased.

Further, this structure produces operation 1 and thus improves the oil separation performance of the oil separator.

(2) The oil discharge port 13 is located on the lower side of the inflow ports 11, 12.

In this structure, the oil separated from the blow-by gas by the first separation wall 21 and accumulated in the lower part of the case 10 easily flows toward the oil discharge port 13. This improves the oil discharge performance.

Further, this structure prevents oil from flowing backward from the oil discharge port 13 to the inflow ports 11, 12.

(3) The oil discharge port 13 is located on one side of the first inflow port 11 and the second inflow port 12 in the arrangement direction of the first inflow port 11 and the second inflow port 12.

In this structure, the inflow port farther from the oil discharge port 13 is located farther from the first connection passage 21a. This allows the blow-by gas that has flowed into the case 10 from the inflow port to easily collide with the first separation wall 21 before reaching the first connection passage 21a. This further improves the oil separation performance.

(4) The case 10 includes the inner case 30 and the outer case 50, which are joined to each other. The inner case 30 includes the first side wall 33 and the second side wall 34. The outer case 50 includes the first side wall 53 and the second side wall 54. The first side walls 33, 53 and the second side walls 34, 54 define the upstream passage 15 and the downstream passage 16. The inner case 30 and the outer case 50 include the first partition plates 41, 61 of the first separation wall 21, respectively. The gap defining the first connection passage 21a is provided between the first partition plate 41 and the second side wall 34 of the inner case 30.

In such a structure, the gap defining the first connection passage 21a is provided between the first partition plate 41 and the second side wall 34 of the inner case 30. Thus, the size of the gap (i.e., the opening area of the first connection passage 21a) is adjusted by adjusting the length of the first partition plate 41. For example, the longer the first partition plate 41, the smaller the gap. The smaller gap facilitates the separation of oil. Further, the longer the first partition plate 41, the smaller the opening area of the first connection passage 21a. The smaller opening area increases the pressure drop of blow-by gas. Accordingly, such a simple method of setting the length of the first partition plate 41 improves the oil separation performance and controls the pressure drop of blow-by gas.

(5) The oil separator includes the second separation wall 22, which is located in the case 10. The second separation wall 22 is located on the upper side of the first connection passage 21a in the downstream passage 16. Further, the second separation wall 22 separates oil from blow-by gas that has flowed into the downstream passage 16 through the first connection passage 21a.

This structure produces operation 2 and thus improves the oil separation performance of the oil separator.

Modifications

The present embodiment may be modified as follows. The present embodiment and the following modifications can be combined as long as they remain technically consistent with each other.

The end 42a of the second partition plate 42 of the inner case 30 may be coupled to the upper first side wall 33a.

The end 62a of the second partition plate 62 of the outer case 50 may be coupled to the upper first side wall 53a.

The second separation wall 22 may be omitted from the case 10.

A gap may be provided between the first partition plate 61 and the second side wall 54 of the outer case 50.

Figure 7:
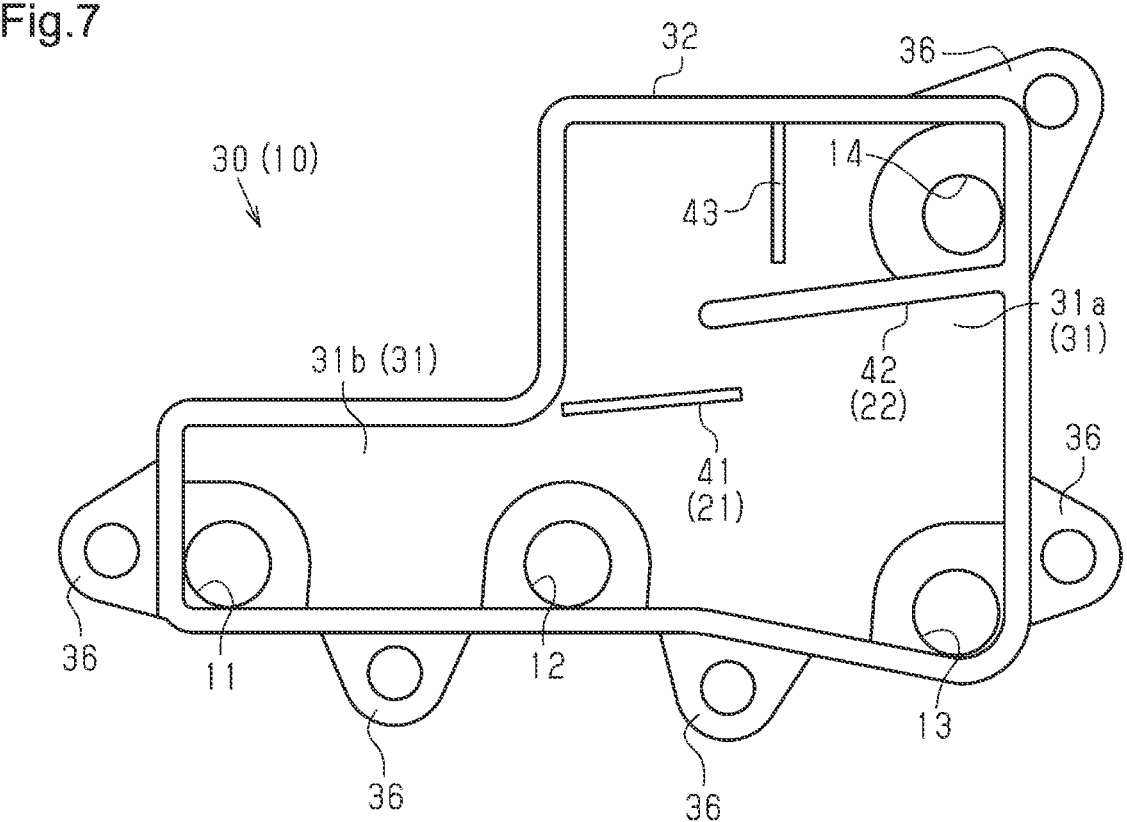
FIG. 7 is a front view showing the inner case of an oil separator according to a modification.

As shown in FIG. 7, the first inflow port 11 and the second inflow port 12 may be arranged in a straight manner in the width direction, and the oil discharge port 13 may be located on the lower side of the inflow ports 11, 12. This also produces the above-described advantage (2).

The oil discharge port 13 may be located between the first inflow port 11 and the second inflow port 12. In this case, the first separation wall 21 is located on the upper side of each of the first inflow port 11 and the second inflow port 12.

The first inflow port 11, the second inflow port 12, and the oil discharge port 13 may be arranged in a straight manner in the width direction.

The case 10 may include three or more inflow ports.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An oil separator for an internal combustion engine, the oil separator comprising:
　a case including inflow ports into which blow-by gas flows, a gas outflow port from which the blow-by gas flows, and an oil discharge port; and
　a separation wall located in the case, wherein
　the oil separator is configured to separate oil from the blow-by gas on the separation wall and discharge the separated oil through the oil discharge port to an outside of the case,
　an upper side in a vertical direction is simply referred to as an upper side,
　an inside of the case is divided by the separation wall into an upstream passage and a downstream passage, the upstream passage being located on an upstream side in a flow direction of the blow-by gas, and the downstream passage being located on a downstream side of the upstream passage in the flow direction and located on the upper side of the upstream passage,
　the inflow ports and the oil discharge port are connected to the upstream passage,
　the gas outflow port is connected to the downstream passage,
　the inflow ports and the oil discharge port are arranged in a direction intersecting the vertical direction,
　the separation wall includes one connection passage that connects the upstream passage to the downstream passage on the upper side of the oil discharge port, and
　the separation wall is located on the upper side of the inflow ports, wherein the separation wall includes a lower surface, part of the lower surface being located immediately above the inflow ports.

2. The oil separator for the internal combustion engine according to claim 1, wherein the oil discharge port is located on a lower side of the inflow ports in the vertical direction.

3. The oil separator for the internal combustion engine according to claim 1, wherein the oil discharge port is located on one side of the inflow ports in an arrangement direction of the inflow ports.

4. The oil separator for the internal combustion engine according to claim 1, wherein
　the case includes a first member and a second member that are joined to each other,
　the first member and the second member each include a first side wall and a second side wall that opposes the first side wall,
　the first side walls and the second side walls define the upstream passage and the downstream passage,
　the first member and the second member each include a partition plate located between the corresponding first side wall and the corresponding second side wall to define the separation wall, and
　a gap is provided between the second side wall and the partition plate of at least one of the first member and the second member to define the connection passage.

5. The oil separator for the internal combustion engine according to claim 1, wherein
　the separation wall is referred to as a first separation wall,
　the oil separator for the internal combustion engine further comprises a second separation wall located in the case, and
　the second separation wall is located on the upper side of the connection passage in the downstream passage and separates oil from the blow-by gas that has flowed into the downstream passage through the connection passage.

6. The oil separator for the internal combustion engine according to claim 1, wherein part of the one connection passage is located immediately above the oil discharge port.

7. The oil separator for the internal combustion engine according to claim 1, wherein the separation wall is a planar separation wall.

\* \* \* \* \*